United States Patent [19]

Nelson et al.

[11] Patent Number: 5,435,908
[45] Date of Patent: Jul. 25, 1995

[54] HYDROCONVERSION PROCESS EMPLOYING CATALYST WITH SPECIFIED PORE SIZE DISTRIBUTION

[75] Inventors: Gerald V. Nelson, Nederland; Govanon Nongbri, Port Neches; Roy E. Pratt, Port Neches; David E. Sherwood, Jr., Beaumont; Pei-Shing E. Dai, Port Arthur, all of Tex.

[73] Assignee: Texaco Inc., White Plains, N.Y.

[21] Appl. No.: 242,995

[22] Filed: May 16, 1994

Related U.S. Application Data

[63] Continuation of Ser. No. 953,176, Sep. 29, 1992, abandoned, which is a continuation of Ser. No. 870,970, Apr. 20, 1992, Pat. No. 5,399,259.

[51] Int. Cl.$^6$ .................... C10G 45/04; C10G 47/12
[52] U.S. Cl. .................... 208/216 PP; 208/251 H; 208/254 H; 208/112
[58] Field of Search ........ 208/216 PP, 251 H, 254 H, 208/112

[56] References Cited

U.S. PATENT DOCUMENTS

| | | | |
|---|---|---|---|
| 4,082,695 | 4/1978 | Rosinski et al. | 502/220 |
| 4,225,421 | 9/1980 | Hensley, Jr. et al. | 208/216 PP |
| 4,357,263 | 11/1982 | Heck et al. | 208/216 PP |
| 4,395,329 | 7/1983 | Le Page et al. | 208/216 PP |
| 4,548,709 | 10/1985 | Bowes et al. | 208/216 PP |
| 4,549,957 | 10/1985 | Hensley, Jr. et al. | 208/216 PP |
| 4,941,964 | 7/1990 | Dai et al. | 208/216 PP |
| 5,047,142 | 9/1991 | Sherwood, Jr. et al. | 208/216 PP |

*Primary Examiner*—Anthony McFarlane
*Assistant Examiner*—Walter D. Griffin
*Attorney, Agent, or Firm*—Kenneth R. Priem; Cynthia L. Hunter

[57] ABSTRACT

Heavy hydrocarbons are hydrotreated to increase content of components boiling below 1000° F. by contact with Group VIII non-noble metal oxide and Group VI-B metal oxide on alumina having a Total Surface Area of 150–240 m$^2$/g, a Total Pore Volume, (TPV) of 0.7–0.98, and a Pore Diameter Distribution whereby ≦20% of the TPV is present as primary micropores of diameter ≦100 Å, at least about 34% of TPV is present as secondary micropores of diameter of about 100 Å–200 Å, and about 26%–46% of the TPV is present as mesopores of diameter >200 Å.

8 Claims, No Drawings

HYDROCONVERSION PROCESS EMPLOYING CATALYST WITH SPECIFIED PORE SIZE DISTRIBUTION

This application is a continuation of U.S. patent application Ser. No. 953,176, filed on Sep. 29, 1992, now abandoned, which is a continuation-in-part of U.S. patent application Ser. No. 870,970, filed Apr. 20, 1992, now U.S. Pat. No. 5,399,259, which discloses a porous alumina support bearing 3-6 w % of Group VIII metal oxide, 14.5-24 w % of Group VI-B metal oxide, and 0-6 w % of phosphorus oxide, characterized by a Total Surface Area of 165-230 m$^2$/g, Total Pore Volume of 0.5-0.8 cc/g, and a Pore Size Distribution (PSD) whereby less than about 5% of Total Pore Volume (TPV) is present as primary micropores of diameter less than about 80 Å and at least about 65% of the TPV is present as secondary micropores of diameter of ±20 Å of a Pore Mode of about 100-135 Å and about 22-29% of the TPV is present as macropores of diameter >250 Å.

FIELD OF THE INVENTION

This invention relates to a process for hydrotreating a hydrocarbon feed. More particularly it relates to a hydroconversion process employing catalyst with a specified pore size distribution.

BACKGROUND OF THE INVENTION

As is well known to those skilled in the art, it is desired to convert heavy hydrocarbons, such as those having a boiling point above about 1000° F., into lighter hydrocarbons which are characterized by higher economic value. It is also desirable to treat hydrocarbon feedstocks, particularly petroleum residues, to achieve other goals including hydrodesulfurization (HDS), hydrodenitrogenation (HDN), carbon residue reduction (CRR), and hydrodemetallation (HDM) - the latter particularly including removal of nickel compounds (HDNi) and vanadium compounds (HDV).

These processes typically employ hydrotreating catalysts with specified ranges of pores having relatively small diameters (i.e. micropores) and pores having relatively large diameters (i.e. macropores).

U.S. patent application Ser. No. 194,378 (Dai et al., filed May 13, 1988), now U.S. Pat. No. 5,047,142 discloses a catalyst composition useful in the hydroprocessing of a sulfur-and metal-containing feedstock comprising an oxide of nickel or cobalt and an oxide of molybdenum on a porous alumina support in such a manner that the molybdenum gradient of the catalyst has value of less than 6.0 and 15-30% of the nickel or cobalt is in an acid extractable form, and having a surface area of 150-210 m$^2$/g, a Total Pore Volume (TPV) of 0.50-0.75 cc/g, and a pore size distribution such that less than 25% TPV is in pores having diameters of less than 100 Å, 70.0-85.0% TPV is in pores having diameters of 100 Å-160 Å and 1.0-15.0% TPV is in pores having diameters of greater than 250 Å.

U.S. patent application Ser. No. 168,095, now U.S. Pat. No. 4,941,964 (Dai et al., filed Mar. 14, 1988) discloses a process for the hydrotreatment of a sulfur- and metal-containing feed which comprises contacting said feed with hydrogen and a catalyst in a manner such that the catalyst is maintained at isothermal conditions and is exposed to a uniform quality of feed, the catalyst comprising an oxide of a Group VIII metal, an oxide of a Group VI-B metal and 0-2.0 weight % of an oxide of phosphorus on a porous alumina support, and having a surface area of 150-210 m$^2$/g and a Total Pore Volume (TPV) of 0.50-0.75 cc/g such that 70-85% TPV is in pores having diameters of 100 Å-160 Å and 5.5-22.0% TPV is in pores having diameters of greater than 250 Å.

U.S. Pat. No. 4,738,944 (Robinson et al.) discloses a catalyst composition useful in the hydrotreatment of hydrocarbon oils, the catalyst containing nickel and phosphorus and about 19-21.5% Mo (calculated as the oxide) on a porous refractory oxide, having a narrow pore size distribution wherein at least 10% TPV is in pores having diameters less than 70 Å, at least 75% TPV is in pores having diameters between 50-110 Å, at least 60% TPV is in pores having diameters within about 20 Å above and below the average pore diameter; and at most 25% TPV, most preferably less than 10% TPV, is in pores having diameters greater than 110 Å.

U.S. Pat. No. 4,652,545 (Lindsley et al.) discloses a catalyst composition useful in the hydroconversion of heavy oils, the catalyst containing 0.5-5% Ni or Co and 1.8-18% Mo (calculated as the oxides) on a porous alumina support, having 15-30% of the Ni or Co in an acid extractable form, and further characterized by having a Total Pore Volume (TPV) of 0.5-1.5 cc/g with a pore diameter distribution such that (i) at least 70% TPV is in pores having 80-120 Å diameters, (ii) less than 0.03 cc/g of TPV is in pores having diameters of less than 80 Å, and (iii) 0.05-0.1 cc/g of TPV is in pores having diameters of greater than 120 Å.

U.S. Pat. No. 4,395,328 (Hensley, Jr. et al.) discloses a process for the hydroconversion of a hydrocarbon stream containing asphaltenes and a substantial amount of metals, comprising contacting the stream (in the presence of hydrogen) with a catalyst present in one or more fixed or ebullating beds, the catalyst comprising at least one metal which may be a Group VI-B or Group VIII metal, an oxide of phosphorus, and an alumina support, where the alumina support material initially had at least 0.8 cc/gm of TPV in pores having diameters of 0-1200 Å, and at least 0.1 cc/gm of TPV is in pores having diameters of 1200-50,000 Å, and the support material was heated with steam to increase the average pore diameter of the catalyst support material.

U.S. Pat. No. 4,341,625 (Tamm) discloses a process for hydrodesulfurizing a metal-containing hydrocarbon feedstock which comprises contacting the feedstock with a catalyst comprising at least one hydrogenation agent (i.e. Group VI-B or Group VIII metal or combinations thereof) on a porous support, the catalyst being further characterized by having a TPV of 0.5-1.1 cc/g with at least 70% TPV in pores having diameters of 80-150 Å and less than 3% TPV in pores having diameters greater than 1000 Å.

U.S. Pat. No. 4,328,127 (Angevine et al.) discloses a catalyst composition for use in the hydrodemetallation-desulfurization of residual petroleum oils, the catalyst comprising a hydrogenating component (i.e. Group VI-B or Group VIII metal, or combinations thereof) on a porous support, and being further characterized by having a TPV of 0.45-1.5 cc/g with 40-75% TPV in pores having diameters of 150-200 Å, and up to 5% TPV in pores having diameters of greater than 500 Å.

U.S. Pat. No. 4,309,278 (Sawyer) discloses a process for the hydroconversion of a hydrocarbon feedstock comprising contacting the feedstock with hydrogen and a catalyst in a fixed bed, moving bed, ebullating bed, slurry, disperse phase, or fluidized bed reactor, where the catalyst comprises a hydrogenation component (i.e. Group VI-B or Group VIII metal) on a porous support, and is further characterized by having a TPV of 1.0–2.5 cc/g with no more than 0.05–0.20 cc/g of TPV in pores having diameters of greater than 400 Å.

U.S. Pat. No. 4,305,965 (Hensley, Jr. et al.) discloses a process for the hydrotreatment of a hydrocarbon stream comprising contacting the stream with hydrogen and a catalyst, the catalyst comprising chromium, molybdenum, and at least one Group VIII metal on a porous support, and further characterized by having a TPV of 0.4–0.8 cc/g with 0–50% TPV in pores having diameters smaller than 50 Å, 30–80% TPV in pores having diameters of 50–100 Å, 0–50% TPV in pores having diameters of 100–150 Å, and 0–20% TPV in pores having diameters greater than 150 Å.

U.S. Pat. No. 4,297,242 (Hensley, Jr. et al.) discloses a 2-stage process for the catalytic hydrotreatment of hydrocarbon streams containing metal and sulfur compounds, the process comprising: (i) first contacting the feedstock with hydrogen and a demetallation catalyst comprising a Group VI-B and/or Group VIII metal; and (ii) thereafter reacting the effluent with a catalyst consisting essentially of at least one Group VI-B metal on a porous support, and having a TPV of 0.4–0.9 cc/g and a pore size distribution such that pores having diameters of 50–80 Å constitute less than 40% TPV, pores having diameters of 80–100 Å constitute 15–65% TPV, pores having diameters of 100–130 Å constitute 10–50% TPV, and pores having diameters of greater than 130 Å less than 15% TPV.

U.S. Pat. No. 4,089,774 (Oleck et al.) discloses a process for the demetallation and desulfurization of a hydrocarbon oil comprising contacting the oil with hydrogen and a catalyst, the catalyst comprising a Group VI-B metal and an iron group metal (i.e. iron, cobalt, or nickel) on a porous support, and having a surface area of 125–210 m²/g and TPV of 0.4–0.65 cc/g with at least 10% TPV in pores having diameters less than 30 Å, at least 50% of pore volume accessible to mercury being in pores having diameters of 30–150 Å, and at least 16.6% of pores accessible to mercury being in pores having diameters greater than 300 Å.

U.S. Pat. No. 4,082,695 (Rosinski et al.) discloses a catalyst for use in the demetallation and desulfurization of petroleum oils, the catalyst comprising a hydrogenating component (i.e. cobalt and molybdenum) on a porous support, and having a surface area of 110–150 m²/g and a pore size distribution such that at least 60% of TPV is in pores having diameters of 100–200 Å and not less than 5% TPV is in pores having diameters greater than 500 Å.

U.S. Pat. No. 4,066,574 (Tamm) discloses a catalyst composition useful in the hydrodesulfurization of a hydrocarbon feedstock containing organometallic compounds, the catalyst comprising Group VI-B and Group VIII metal components on a porous support, and having a TPV of 0.5–1.1 cc/g with a pore diameter distribution such that at least 70% TPV is in pores of diameters of 80–150 Å and less than 3% TPV is in pores having diameters greater than 1000 Å.

U.S. Pat. No. 4,051,021 (Hamner) discloses a catalytic process for the hydrodesulfurization of a hydrocarbon feed which comprises contacting the feed with hydrogen and a catalyst, the catalyst comprising a Group VI-B and Group VIII metal on a porous support, and having a TPV of 0.3–1.0 cc/g with a pore diameter distribution such that greater than 50% TPV is in pores of diameters of 70–160 Å, and pores having diameters below 70 Å and above 160 Å are minimized.

U.S. Pat. No. 4,048,060 (Riley) discloses a two-stage process for hydrodesulfurizing a heavy hydrocarbon feed which comprises: (i) contacting the feed with hydrogen and a first catalyst to produce a first hydrodesulfurized hydrocarbon product, the first catalyst comprising a Group VI-B and Group VIII metal on a porous support and having a mean pore diameter of 30–60 Å; and (ii) contacting the first hydrodesulfurized hydrocarbon product with hydrogen and a second catalyst under hydrodesulfurization conditions, the second catalyst comprising a Group VI-B and Group VIII metal on a porous support and being further characterized by having a TPV of 0.45–1.50 cc/g with 0.–0.5 cc/g of TPV in pores having diameters greater than 200 Å, 0–0.05 cc/g of TPV in pores having diameters below 120 Å, and at least 75% TPV in pores having diameters ±10Å of a mean pore diameter of 140–190 Å.

U.S. Pat. No. 3,876,523 (Rosinski et al.) discloses a process for the demetallizing and desulfurizing of residual petroleum oil comprising contacting the oil with hydrogen and a catalyst, the catalyst comprising a Group VI-B and Group VIII metal on a porous support and having a pore size distribution such that greater than 60% TPV is in pores having diameters of 100–200 Å, at least 5% TPV is in pores having diameters greater than 500 Å, and 10% TPV or less is in pores having diameters less than 40 Å, and the surface area of the catalyst is 40–150 m²/g.

U.S. Pat. No. 3,770,617 (Riley et al.) discloses a process for the desulfurization of a petroleum hydrocarbon feed comprising contacting the feed with hydrogen and a catalyst, the catalyst comprising a Group VI-B or Group VIII metal on a porous support and having greater than 50% TPV in pores of 30–80 Å, less than 4% TPV in pores having diameters 200–2000Å, and at least 3% TPV in pores having diameters greater than 2000 Å.

U.S. Pat. No. 3,692,698 (Riley et al.) discloses a catalyst useful in hydroprocessing of heavy feed stocks, the catalyst comprising a mixture of Group VI-B and Group VIII metals on a porous support and having a pore size distribution such that a major portion of its TPV is in pores of diameters ranging from 30–80 Å, less than 4% TPV is in pores of diameters of 200–2000 Å, and at least 3% TPV is in pores of diameters greater than 2000 Å.

U.S. Pat. No. 4,746,419 (Peck et al) discloses catalyst compositions characterized by presence of 0.1–0.3 cc/g of its pore volume in pores having diameter greater than 1200 Å and no more than 0.1 cc/g of its pore volume in pores having diameter greater than 4000 Å.

Early petroleum distillate hydrotreating catalysts generally were monomodal catalysts with very small micropore diameters (less than say 100 Å) and rather broad pore size distributions. First generation petroleum resid hydrotreating catalysts were developed by introducing a large amount of macroporosity into a distillate hydrotreating catalyst pore structure to overcome the diffusion resistance of large molecules. Such catalysts, which are considered fully bimodal HDS/HDM catalysts, are typified by U.S. Pat. Nos. 4,395,328 and 4,089,774 supra.

Another approach to developing improved catalysts for petroleum resid processing has involved enlarging the micropore diameters of essentially monomodal catalysts (having no significant macroporosities) to overcome the above described diffusion limitations. Essentially monomodal catalysts with small micropore diameters and low macroporosities designed for improved petroleum resid HDS include those disclosed in U.S. Pat. Nos. 4,738,944; 4,652,545; 4,341,625; 4,309,378; 4,306,965; 4,297,242; 4,066,574; 4,051,021; 4,048,060 (1st stage catalyst); 3,770,617; and 3,692,698, supra. Essentially monomodal catalysts with larger micropore diameters and low macroporosities designed for improved petroleum resid HDM include those disclosed in U.S. Pat. Nos. 4,328,127; 4,309,278; 4,082,695; 4,048,060 (2nd stage catalyst); and 3,876,523, supra.

A recent approach to developing improved catalysts for petroleum resid processing has involved the use of catalysts having micropore diameters intermediate between the above described monomodal HDS and HDM catalysts, as well as sufficient macroporosities so as to overcome the diffusion limitations for petroleum bottoms HDS (i. e., sulfur removal from hydrocarbon product of a hydrotreated petroleum resid having a boiling point greater than 1000° F.) but limited macroporosities to limit poisoning of the interiors of the catalyst particles. Catalysts, with micropore diameters intermediate between the above-described monomodal HDS and HDM catalysts with limited macroporosities include those of U.S. patent application Ser. No. 168,095 (now U.S. Pat. No. 4,941,964); and 194,378 (now U.S. Pat. No. 5,047,142 supra).

However, none of the above-identified catalyst types has been found to be effective for achieving desired levels of hydroconversion of feedstocks components having a boiling point greater than 1000° F. to products having a boiling point less than 1000° F. while simultaneously yielding a 1000° F.+product having a lower sulfur content.

It is a particular feature of the prior art, however, that it has not heretofore has been possible to carry out hydrotreating of such feedstocks to attain desirable results as measured by conversion without undesirable formation of sediment. The charge to hydrotreating is typically characterized by a very low sediment content of 0.01 w % max.

Sediment is typically measured by testing a sample by the Shell Hot Filtration Solids Test (SHFST). See Jour, Inst. Pet (1951) 37 pages 596–604 Van Kerknoort et al incorporated herein by reference. Typical prior art hydrotreating processes commonly yield Shell Hot Filtration Solids SHFS of above about 0.19 w % and as high as about 1 w % in the 650° F.+product recovered from the bottoms flash drum (BFD). Production of large amounts of sediment is undesirable in that it results in deposition in downstream units which in due course must be removed. This of course requires that the unit be shut down for an undesirably long period of time.

It is an object of this invention to provide a process for hydrotreating a charge hydrocarbon feed. Other objects will be apparent to those skilled in the art.

STATEMENT OF THE INVENTION

In accordance with certain of its aspects, this invention is directed to a process for hydrotreating a charge hydrocarbon feed containing components boiling above 1000° F., and sediment-formers, sulfur, metals, asphaltenes, carbon residue, and nitrogen which comprises contacting said charge hydrocarbon feed with hydrogen at isothermal hydrotreating conditions in the presence of, as catalyst, a porous alumina support bearing 2.2–6 w % of a Group VIII non-noble metal oxide, 7–24 w % of a Group VI-B metal oxide, and 0–2 w % of a phosphorus oxide, said catalyst having a Total Surface Area of 150–240 m$^2$/g, a Total Pore Volume of 0.7–0.98 cc/g, and a Pore Diameter Distribution whereby less than about 20% of the Total Pore Volume is present as primary micropores of diameter less than about 100 Å, at least about 34% of the Total Pore Volume is present as secondary micropores of diameter of about 100 Å–200 Å, and about 26–46% of the Total Pore Volume is present as mesopores of diameter <200 Å, thereby forming hydrotreated product containing decreased contents of components boiling above 1000° F., sediment, sulfur, metals, carbon residue, and asphaltenes.

DESCRIPTION OF THE INVENTION

The charge hydrocarbon feed which may be charged to the process of this invention may include heavy, high boiling petroleum cuts typified by gas oils, vacuum gas oils, coal/oil mixtures, residual oils, vacuum resid, etc. The process of this invention is particularly useful to treat high boiling oils which contain components boiling above 1000° F. to convert them to products boiling below 1000° F. The charge may be a petroleum fraction having a boiling point of above 650° F. characterized by presence of an undesirably high content of components boiling above 1000° F., sediment-formers, metals, sulfur, carbon residue, and asphaltenes.

It is a particular feature of the process of this invention that it may permit treating of hydrocarbon charge, particularly those containing components boiling above about 1000° F., to form product which is characterized by an increased content of components boiling below 1000° F. and by decreased content of undesirable components typified by sediment, metals, sulfur, carbon residues, and asphaltenes. Asphaltenes are herein defined as the quantity of n-heptaneinsolubles minus the quantity of toluene-insolubles in the feedstock or product.

An illustrative charge which may be utilized is an Arabian Medium/Heavy Vacuum Resid having the following properties set forth in the first column of the table - the second column setting forth the properties of another typical charge which includes a mixture of a fluid cracked heavy cycle gas oil (FC HCGO) and an Arabian Medium/Heavy Vacuum Resid:

TABLE

| Property | I | II |
|---|---|---|
| API Gravity | 4.4 | 3.1 |
| 1000° F.+, vol % | 87.3 | 76.1 |
| 1000° F.+, w % | 88.3 | — |
| 1000° F.−, w % | 11.7 | — |
| Sulfur, w % | 5.8 | 5.6 |
| Total Nitrogen, wppm | 4815 | 4328 |
| Hydrogen, w % | 10.10 | 9.88 |
| Carbon, w % | 83.5 | 84.10 |
| Alcor MCR, w % | 22.4 | 20.2 |
| Kinematic Viscosity, cSt | | |
| @ 200° F. | 1706 | — |
| @ 250° F. | 476 | — |
| Pour Point, °F. | 110 | — |
| n-C$_5$ Insolubles, w % | 35.6 | 30.16 |
| n-C$_7$ Insolubles, w % | 10.97 | 9.49 |
| Toluene Insolubles, w % | 0.01 | 0.01 |
| Asphaltenes, w % | 10.96 | 9.48 |
| Metals, wppm | | |
| Ni | 44 | 37 |
| V | 141 | 118 |
| Fe | 11 | 9 |

TABLE-continued

| Property | I | II |
|---|---|---|
| Sediment, wppm | Nil | Nil |

In practice of the process of this invention according to certain of its aspects, the charge hydrocarbon feed is mixed with about 15v% of a fluid cracked heavy cycle gas oil (to form a mixture such as that of column 2 of the Table supra) and contacted with hydrogen at isothermal hydrotreating conditions in the presence of catalyst. Hydrogen is charged at a rate of 2000–10,000 SCFB, preferably 3000–8000, say 5084 SCFB. Temperature of operation is typically 650°F.–850° F., preferably 700°F.–825° F., say 819° F. The operation is essentially isothermal; and the temperature typically may vary throughout the bed by less than about 20° F. Pressure of operation (i.e. reactor inlet partial pressure of hydrogen) may be 1500–3500 psia, preferably 1800–2500 psia, say 2495 psia.

The catalyst support may be alumina. Although the alumina may be alpha, beta, theta, or gamma alumina, it is preferred to utilize gamma alumina.

The catalyst which may be employed is characterized by Total Surface Area (TSA), Total Pore Volume (TPV), and Pore Diameter Distribution (Pore Size Distribution PSD). The Total Surface Area is 150–240, preferably 165–210, say 199 m²/g. The Total Pore Volume (TPV) may be 0.70–0.98, preferably 0.75–0.95, say 0.87 cc/g.

The Pore Size Distribution (PSD) is such that the substrate contains primary micropores of diameter less than about 100 Å in amount less than 0.20 cc/g and preferably less than about 0.15 cc/g. Although it may be desired to decrease the volume of these primary micropores to 0 cc/g, in practice its found that the advantages of this invention may be attained when the volume of the primary micropores is 0.04–0.16 cc/g, say 0.09 cc/g. This corresponds to less than about 20% of TPV, preferably less than about 18% of TPV. The advantages are particularly attained at about 5–18%, say 10% of TPV. It will be apparent that the figures stated for the % of TPV may vary depending on the actual TPV (in terms of cc/g).

Secondary micropores of diameter in the range of about 100 Å–200 Å are present in amount as high as possible and at least about 0.33 cc/g (34% of TPV) and more preferably at least about 0.40 cc/g (50% of TPV). Although it is desirable to have the volume of secondary micropores as high as possible (up to about 74%) of the TPV, it is found that the advantages of this invention may be attained when the volume of secondary micropores is 0.33–0.6 cc/g, say about 0.49 cc/g. (i.e. 34–74, say 56.3% of TPV).

Mesopores of diameter <200Å are present in amount of 0.18–0.45 cc/g (26–46% of TPV). In the preferred embodiment, its preferred that the mesopores be present in amount of 0.22–0.37 cc/g (26–46% of TPV) say about 0.29 cc/g (about 33.4% of TPV).

Macropores of diameter <1000Å are preferably present in amount of about 0.1–0.32 cc/g (14–33% of TPV), say about 0.16 cc/g (18.4% of TPV).

It will be apparent that the catalysts of this invention are essentially bimodal: there is one major peak in the secondary micropore region of 100 Å–200 Å and a second lesser peak in the mesopore region of ≧200 Å.

The charge alumina which may be employed in practice of this invention may be available commercially from catalyst suppliers or it may be prepared by variety of processes typified by that wherein 85–90 parts of pseudobohmite silica-alumina is mixed with 10–15 parts of recycled fines. Acid is added and the mixture is mulled and then extruded in an Auger type extruder through a die having cylindrical holes sized to yield a calcined substrate of 0.035±0.003 inch diameter. Extrudate is air-dried to a final temperature of typically 250°–275° F. yielding extrudates with 20–25% of ignited solids. The air-dried extrudate is then calcined in an indirect fired kiln for 0.5–4 hours in an atmosphere of air and steam at typically about 1000°–1150° F.

It should be noted that the Pore Size Distribution (percent of total) in the finished catalyst may be essentially the same as in the charge alumina from which it is prepared (unless the majority of the pore volume distribution in a given range is near a "break-point" - e.g. 100 Å or 200 Å, in which case a small change in the amount of pores of a stated size could modify the reported value of the pore volume falling in a reported range). The Total Surface Area and the Total Pore Volume, of the finished catalyst may be 80%–98%, say 96% of the charge alumina from which it is prepared.

Generally the charge alumina and the finished catalysts of this invention will be characterized by the properties set forth in the following Table wherein the columns are as follows:

1. This column lists the broad characteristics for the catalysts of this invention including Pore Volume in cc/g and as % of TPV; Pore Volume occupied by pores falling in designated ranges - as a v% of Total Pore Volume TPV; Pore Mode; Pore Volume falling within ±20 Å from the dV/dD peak in the less than 250 Å region; Pore Volume falling within ±20 Å from the dV/dD peak in the less than 200 Å region; and Surface Area in m²/g.
2. This column lists a comparable broad range of properties for a First Type of catalyst falling within the scope of this invention.
3–4. These columns list specific properties of illustrative First Type catalysts.
5. This column lists a comparable broad range of properties for a Second Type of catalyst falling within the scope of this invention.
6–7. These columns list specific properties of illustrative Second Type catalysts.

TABLE

| cc/g | 1 | 2 | 3 | 4 | 5 | 6 | 7 |
|---|---|---|---|---|---|---|---|
| TPV | 0.7–0.98 | 0.7–0.98 | 0.87 | 0.81 | 0.7–0.98 | 0.87 | 0.77 |
| ≧1000 Å | 0.1–0.32 | 0.1–0.22 | 0.16 | 0.13 | 0.15–0.32 | 0.23 | 0.23 |
| ≧250 Å | 0.15–0.42 | 0.15–0.31 | 0.26 | 0.18 | 0.22–0.42 | 0.32 | 0.29 |
| ≧200 Å | 0.18–0.45 | 0.18–0.34 | 0.29 | 0.22 | 0.24–0.45 | 0.37 | 0.31 |
| ≦100 Å | 0.2 max | 0.15 max | 0.09 | 0.04 | 0.2 max | 0.16 | 0.09 |
| 100–200 Å | 0.33 min | 0.40 min | 0.49 | 0.55 | 0.33 min | 0.34 | 0.37 |
| % | | | | | | | |
| TPV | 100 | 100 | 100 | 100 | 100 | 100 | 100 |
| ≧1000 Å | 14–33 | 14–22 | 18.4 | 16 | 22–33 | 26.4 | 29.2 |

| cc/g | 1 | 2 | 3 | 4 | 5 | 6 | 7 |
|---|---|---|---|---|---|---|---|
| ≧250 Å | 22–43 | 22–32 | 29.9 | 22.2 | 32–43 | 36.8 | 37.7 |
| ≧200 Å | 26–46 | 26–35 | 33.4 | 27.2 | 35–46 | 42.5 | 40.2 |
| ≦100 Å | 20 max | 15 max | 10.3 | 4.9 | 20 max | 18.4 | 11.7 |
| 100–200 Å | 34 min | 50 min | 56.3 | 67.9 | 34 min | 39.1 | 48.1 |
| Pore Mode Å dV/dD max from Hg | 85–145 | 100–145 | 116 | 125 | 85–135 | 95 | 125 |
| Pore Vol. ±20 Å from dV/dD max, % PV <250 Å | 40 min | 53 min | 57.5 | 59 | 40 min | 43.6 | 56.5 |
| Pore Vol. ±20 Å from dV/dD max, % PV <200 Å | 44 min | 57 min | 60.5 | 63 | 44 min | 48 | 59 |
| Total Sur. Area m²/g | 150–240 | 155–240 | 199 | 210 | 150–210 | 172 | 165 |

The alumina charge extrudates may be loaded with metals to yield a product catalyst containing a Group VIII non-noble oxide in amount of 2.2–6 w %, preferably 2.6–3.5 w %, say 3.1 w % and a Group VI-B metal oxide in amount of 7–24, preferably 10–24 w %, say 14.

The Group VIII metal may be a non-noble metal such as iron, cobalt, or nickel. This metal may be loaded onto the alumina typically from a 10%–50%, say 30.0% aqueous solution of a water-soluble salt (e.g. a nitrate, acetate, oxalate etc.). The preferred metal may be nickel, employed as a 30 w % aqueous solution of nickel nitrate.

The Group VI-B metal may preferably be chromium, molybdenum, or tungsten. This metal may be loaded onto the alumina typically from a 10%–25%, say 15% aqueous solution of a water-soluble salt such as ammonium molybdate.

It is a feature of the catalysts of the invention that they preferably contain not more than about 2 w % of $P_2O_5$ and preferably less than about 0.2 w %. (Phosphorus-containing components are not intentionally added during catalyst preparation). Presence of phosphorus undesirably contributes to sediment formation.

Silica $SiO_2$ may be incorporated in small amounts typically up to about 2.5 w %, although the benefits of the invention may be attained without addition of silica.

The product catalyst may be characterized by the following content of metals:

TABLE

| w % | \multicolumn{7}{c}{Metals} | | | | | | |
|---|---|---|---|---|---|---|---|
|   | 1 | 2 | 3 | 4 | 5 | 6 | 7 |
| VIII | 2.2–6 | 2.5–6 | 3.1 | 3.3 | 2.2–6 | 2.6 | 3.5 |
| VIB | 7–24 | 13–24 | 14 | 15.1 | 7–24 | 9.8 | 14 |
| $SiO_2$ | <2.5 | <2.5 | 2 | 1.9 | <2 | 0.02 | none |
| $P_2O_5$ | <2 | <2 | ≦0.2 | <0.2 | <2 | <0.2 | <0.2 |

These catalyst metals may be loaded onto the alumina support by spraying the latter with a solution of the former. Although it is preferred to load the metals simultaneously, it is possible to load each separately. Small amounts of $H_2O_2$ may be added to stabilize the impregnating solution. It is preferred that solutions stabilized with $H_3PO_4$ not be used - in order to avoid incorporating phosphorus into the catalyst. Loading of each metal may be effected by spraying the alumina support with the aqueous solution at 60°F.–100° F., say 80° F. followed by draining, drying at 220°F.–300° F., say 250° F. for 2–10 hours, say 4 hours, and calcining at 900°F.–1250° F., say 1150° F. for 0.5–5 hours, say 0.5 hour.

In practice of the process of this invention, the catalyst, preferably in the form of extruded cylinders of 0.038 inch diameter and 0.15 inch length may be placed within a reactor. The hydrocarbon charge is admitted to the lower portion of the bed in liquid phase at 650°F.–850° F., preferably 700°F.–825° F., say 819° F. and 1000–3500 psig, preferably 1500–3000 psia, say 2495 psia. Hydrogen gas is admitted with the hydrocarbon charge in amount of 2000–10,000 SCFB, preferably 3000–8000 SCFB, say 5084 SCFB. The hydrocarbon charge passes through the bed at a LHSV of 0.08–1.5, preferably 0.1–1.0, say 0.40. During operation, the bed expands to form an ebullated bed with a defined upper level. Operation is essentially isothermal with a typical maximum temperature difference between the inlet and the outlet of 0°F.–50° F., preferably 0°F.–30° F., say 15° F.

In a less preferred embodiment, the reaction may be carried out in one or more continuously stirred tank reactors (CSTR) which also provides essentially isothermal conditions.

During passage through the reactor, preferably containing an ebullated bed, the hydrocarbon feedstock may be converted to lower boiling products by the hydrotreating/hydrocracking reaction. In a typical embodiment, a charge containing 60 w % -95%, say 76.1 w % boiling above 1000° F. and 5 v %–40 v %, say 23.9 v % boiling in the 600°F.–1000° F. range may be converted to a hydrotreated product containing only 3 v %–45 v %, say 14 v % boiling above 1000° F. The sulfur of the original charge is 3–7 w %, typically 5.6 w %; the sulfur content of the unconverted 1000° F.+component in the product is 0.5–3.5 w %, typically 2.6 w %.

It is a particular feature of the catalysts of this invention that they permit operation to be carried out under conditions which yield a substantially decreased content of sediment in the product stream leaving hydrotreating. (Sediment is measured by the Shell Hot Filtration Solids Test of Van Kerknoort et al Jour. Inst. Pet (1951) 596–604). Sediment in the product is undesirable because it deposits on and inside of various pieces of equipment downstream of hydrotreating and interferes with proper functioning of e.g. pumps, heat exchangers, fractionating towers, etc.

Commonly sediment that is formed from hydrotreating the charge may be as high as 1 w %, typically 0.2–0.9 w %, say 0.19 w %. Prior art processes may reduce this to 0.1–0.4 w %. It is a feature of the catalysts of this invention that they permit attainment of hydrotreated product with sediment content typically as low as 0.03–0.07 w %, say 0.03 w %.

It will be noted that catalysts of this invention, characterized by (i) 0.1–0.32 cc/g of pores in the <1000 Å range, (ii) 0.18–0.45 cc/g of pores in the <200 Å range, (iii) 0.2 cc/g maximum pores in the ≦100 Å range, and (iv) 0.33 cc/g minimum of pores in the 100 Å–200 Å range - are particularly advantageous in that they permit attainment of product hydrocarbon streams containing the lowest content of sediment at highest conversion, while producing product characterized by low nitrogen, low sulfur, and low metals content.

ADVANTAGES OF THE INVENTION

It will be apparent to those skilled in the art that this invention is characterized by advantages including the following:

(i) it permits attainment of yield of hydrocarbon products boiling below 1000° F;

(ii) it permits operation to yield highly desulfurized hydrocarbon product;

(iii) it permits operation to yield hydrocarbon product characterized by lower content of metals;

(iv) the 650°F.–1000° F. portion of the product is also characterized by a desirably lower content of nitrogen and sulfur;

(v) the 1000° F.+ component of the product is characterized by a significantly lower content of sulfur;

(vi) the liquid product is characterized by a low content of sediment (0.03–0.07 w %, say 0.03 w %). Thus it would be expected to improve unit operability and to prevent unscheduled shutdowns caused by sediment deposition in the down-stream fractionation equipment.

(vii) the liquid product is characterized by a significant reduction of asphaltenes and carbon residue.

Practice of the process of this invention will be apparent to those skilled in the art from the following wherein all parts are parts by weight unless otherwise stated. Control examples are designated by an asterisk.

DESCRIPTION OF SPECIFIC EMBODIMENTS

In the examples, the following charge stocks were employed:

TABLE

| Property | Charge Stocks | | | |
|---|---|---|---|---|
| | I | II | III | IV |
| API Gravity | 3.3 | 3.1 | 6.0 | 4.4 |
| Sulfur w % | 5.29 | 5.55 | 3.78 | 5.19 |
| Nitrogen wppm | 4430 | 4328 | 5752 | 4220 |
| Vanadium wppm | 118 | 118 | 122 | 113 |
| Nickel wppm | 34 | 37 | 57 | 36 |
| CCR w % | 19.0 | 20.2 | 22.1 | 19.6 |
| 1000° F.+ v % | 74.7 | 76.1 | 93.7 | 66.5 |
| Sediment w % | Nil | Nil | Nil | Nil |
| Asphaltenes w % | 9.62 | 9.48 | 10.05 | 9.17 |

EXAMPLE I

In this example which represents the best mode presently known of carrying out the process of this invention, the charge hydrocarbon is the 3.1 API Arabian Medium/Heavy Vacuum Resid of column II having the properties set forth in the table supra. It should be noted that this charge hydrocarbon is particularly characterized by the presence of 76.1 v % of components having a boiling point above 1000° F., by a sulfur content of 5.55 w %, by a vanadium content of 118 wppm, a nickel content of 37 wppm, and a nitrogen content of 4328 wppm.

The catalyst is prepared from a commercially available gamma alumina having the properties set forth in the Table which follows which notes the Total Surface Area TSA in square meters per gram of alumina, Total Pore Volume TPV in cubic centimeters per gram, and the Pore Volume PV, as a percent of TPV, arising from pores of noted diameter (A):

TABLE

| Property | Finished Catalyst | Charge Alumina |
|---|---|---|
| TSA m²/g | 199 | 208 |
| TPV cc/g | 0.87 | 0.99 |
| PV % ≧ 1000 Å | 18.4 | 19.2 |
| PV % ≧ 250 Å | 29.9 | 27.3 |
| PV % ≧ 200 Å | 33.4 | 29.3 |
| PV % ≦ 100 Å | 10.3 | 34.3 |
| PV % ≦ 100–200 Å | 56.3 | 36.4 |

This alumina in the form of extrudate of diameter of 0.035–0.041 inch is impregnated at 80° F. with an aqueous solution which contains nickel nitrate hexahydrate and ammonium molybdate and hydrogen peroxide. The catalyst is dried at 250° F. for 4 hours and calcined at 1150° F. for 30 minutes.

The product catalyst is characterized as follows:

TABLE

| Component | W % |
|---|---|
| MoO₃ | 14.0 |
| NiO | 3.1 |
| SiO₂ | 2.0 |
| SO₄ | Nil |
| Na₂O | 0.02 |
| P₂O₅ | <0.2 |

Charge hydrocarbon is admitted in liquid phase at 2495 psia to the first stage of a two stage ebullated bed at an overall liquid space velocity LHSV of 0.40 and an overall average temperature of 819° F. Hydrogen is admitted in amount of 5084 SCFB.

Product is collected from the second stage and analyzed to yield the following data:

TABLE

| Overall Performance | | |
|---|---|---|
| 1000 F.+ conversion | w % | 81.1 |
| Desulfurization | w % | 81.9 |
| Denitrogenation | w % | 43.6 |
| Ni removal | w % | 82.9 |
| V removal | w % | 97.2 |
| CCR Reduction | w % | 66.0 |
| Asphaltenes Reduction | w % | 55.0 |
| 1000 F.+ Product | | |
| Asphaltenes | w % | 27.6 |
| Gravity API | w % | −4.8 |
| Total Nitrogen | wppm | 6964 |
| Sulfur | w % | 2.6 |
| CCR | w % | 44.4 |
| Bottoms Flash Drum Product* | | |
| Sediment | w % | 0.03 |

*Bottoms Flash Drum (BFD) Product is nominally 650° F.+ boiling range.

From the above, it is apparent that it is possible to hydrotreat to attain high 1000° F. + Conversion (of e.g. 81.1%) with production of extremely low (0.03 w T) BFD Sediment. Prior art hydrotreating operations are limited to much lower Conversions (e.g. 60%) in order to permit attainment of product containing minimum Sediment 0 and even at the decreased level of Conversion, the prior art BFD Sediment may be as high as about 0.2–0.9% i.e. about 7–30 times as great as is observed in the case of the process of this invention.

EXAMPLE II

In this Example, the charge and catalyst are the same as in Example I. Operating conditions are as follows:

TABLE

| | |
|---|---|
| Inlet hydrogen pressure psia | 2377 |
| Temperature °F. | 808 |
| LHSV | 0.41 |
| Hydrogen rate SCFB | 4940 |
| Number of Stages | 2 |

TABLE

| Property | | Value |
|---|---|---|
| Overall Performance | | |
| 1000° F.+ Conversion | v % | 74.3 |
| Desulfurization | w % | 80.2 |
| Denitrogenation | w % | 41.9 |
| CCR Reduction | w % | 60.6 |
| Asphaltenes Reduction | w % | 69.0 |
| 1000° F. Product | | |
| Gravity API | | −1.1 |
| Asphaltenes | w % | 14.8 |
| Sulfur | w % | 2.5 |
| CCR | w % | 36.8 |
| BFD Product | | |
| Sediment | w % | 0.04 |

EXAMPLE III

In this Example, the catalyst of Example I is employed. The charge hydrocarbon is that of Column I particularly characterized by 74.7 v % of components boiling above 1000° F.

Conditions of operation include inlet hydrogen pressure of 2418 psia at 787° F. and LHSV of 0.35. Hydrogen is admitted in amount of 5431 SCFB to the two stage reactors.

The results are as follows:

| Property Overall Performance | | Value |
|---|---|---|
| 1000° F.+ Conversion | v % | 60.0 |
| Desulfurization | w % | 80.0 |
| Denitrogenation | w % | 40.0 |
| CCR Reduction | w % | 58.0 |
| BFD Sediment | w % | 0.07 |
| Asphaltene Reduction | w % | 70.2 |

From the above it is clear that the results attained in terms of desulfurization, denitrification, and CCR reduction at 60.0 v % Conversion of 1000F+ are satisfactory while the attainment of BFD Sediment of only 0.07 w % is unexpectedly and significantly lower than the 0.2–0.9 range attained by prior art techniques at the same 60% conversion level.

EXAMPLES IV*–V*

In Control Examples IV* α V*, typical prior art catalysts are employed having the following preperties:

TABLE

| Property | | Example IV* (cc/g) | Example V* (cc/g) |
|---|---|---|---|
| TPV | | 0.76 | 0.65 |
| >4000 | Å | 0.06 | 0.00 |
| >1000 | Å | 0.19 | 0.01 |
| >500 | Å | 0.21 | 0.02 |
| >300 | Å | 0.23 | 0.04 |
| >250 | Å | 0.23 | 0.05 |
| >200 | Å | 0.24 | 0.07 |
| >100 | Å | 0.29 | 0.59 |
| <100 | Å | 0.47 | 0.06 |
| <200 | Å | 0.52 | 0.58 |
| 100–200 | Å | 0.05 | 0.52 |
| 200–300 | Å | 0.01 | 0.03 |
| 300–500 | Å | 0.02 | 0.02 |
| 500–1000 | Å | 0.02 | 0.01 |
| 1000–4000 | Å | 0.13 | 0.01 |
| Metals w % | | | |
| NiO | | 3.1 | 3.0 |
| MoO$_3$ | | 12.4 | 15 |
| SiO$_2$ | | 0.02 | 2.5 |
| P$_2$O$_5$ | | ≦0.2 | ≦0.2 |
| Surface Area m$^2$/g | | 315 | 194 |

EXAMPLE IV*

The catalyst of Example IV* is evaluated with the 4.4 API charge hydrocarbon set forth in column IV supra. Conditions of operation include inlet hydrogen pressure of 2375 psia at 787° F. and overall LHSV of 0.35. Hydrogen is admitted in amount of 5431 SCFB to the two stage reactors.

The results as follows:

TABLE

| Property | | Value |
|---|---|---|
| 1000° F. Conversion | v % | 60.0 |
| Overall Desulfurization | w % | 73.2 |
| Overall Denitrogenation | w % | 35.0 |
| Overall CCR Reduction | w % | 55.0 |
| Overall Asphaltene Reduction | w % | 54.5 |
| BFD Sediment | w % | 0.19 |

From a comparison of example III and Control Example IV*, it is seen that the catalyst of this invention, Example III, provides improved desulfurization, denitrogenation, and CCR reduction while providing a much lower sediment (0.07 w % v 0.19 w %) at the 60v% 1000° F. conversion level, compared to Control Example IV*.

EXAMPLE V*

In this Control Example V*, the catalyst is evaluated with the same charge hydrocarbon as used in Example III. A two stage operation is carried out at 780° F., 0.35 LHSV, 2414 psia reactor inlet hydrogen partial pressure, and 5658 SCFB hydrogen.

The results are as follows:

TABLE

| Property | | Value |
|---|---|---|
| 1000° F.+ Conversion | v % | 60.0 |
| Overall Desulfurization | w % | 81.9 |
| Overall Denitrogenation | w % | 40.0 |
| Overall CCR Reduction | w % | 60.3 |
| Overall Asphaltene Reduction | w % | 63.4 |

TABLE-continued

| Property | | Value |
|---|---|---|
| BFD Sediment | w % | 0.90 |

During the run, a considerable amount of equipment plugging occurred due to the high sediment content (0.90 w %) of the product. The unit was shutdown for clean-out after an undesirably short run time. It would have been impossible to attempt to use this catalyst to attain desired higher conversion levels such as those attained in Examples I (81.1 w %) and II (74.3 w %). (It is generally observed that BFD sediment increases with an increase in 1000° F. Conversion).

It is clear the the catalysts of this invention (e.g. Example I showing 0.04 w % sediment) provide significantly better sediment control over the Control prior art catalysts (Example IV* 0.19 w % or Example V* 0.90 w %) by a factor of about 5-25. It is only the catalyst of this invention which minimizes sediment while obtaining superior desulfurization, denitrogenation, and CCR reduction.

EXAMPLE VI

In this Example, the charge hydrocarbon is the 6.0 API Gravity stock III in the Table supra. The catalyst is that set forth in Column 6 of the Catalyst Table supra of TPV of 0.87 cc/g and Pore Mode of 95 Å. Conditions of operation for a single stage evaluation include inlet hydrogen pressure of psia at 793° F. Space velocity (LHSV) is 0.289 and hydrogen feed rate is 4707 SCFB.

TABLE

| Property | | Value |
|---|---|---|
| 1000° F.+ Conversion | v % | 62.4 |
| Desulfurization | w % | 62.0 |
| Denitrogenation | w % | 28.0 |
| Vanadium Removal | w % | 86.1 |
| Nickel Removal | w % | 76.5 |
| CCR Removal | w % | 50.9 |
| Asphaltenes Removal | w % | 43.8 |
| 1000° F.+ Product | | |
| Gravity API | | 2.4 |
| Sulfur | w % | 2.79 |
| CCR | w % | 29.5 |
| Asphaltenes | w % | 15.6 |
| BFD Sediment | w % | 0.12 |

EXAMPLE VII*

In this Control Example, the charge is the same 6.0 API Gravity liquid of Column III of the Table supra.

The catalyst is the typical prior art hydrotreating catalyst employed in Example IV*.

Operating conditions for the single stage evaluation are 793° F., 2341 psia inlet hydrogen partial pressure, 0.271 LHSV, and 5310 SCFB hydrogen.

The following results are obtained:

TABLE

| Property | | Value |
|---|---|---|
| 1000 F.+ Conversion | v % | 63.2 |
| Desulfurization | w % | 70.4 |
| Denitrogenation | w % | 26.0 |
| Asphaltene Reduction | w % | 44.3 |
| Vanadium Removal | w % | 78.1 |
| Nickel Removal | w % | 64.2 |
| CCR Reduction | w % | 49.6 |
| 1000 F.+ Product | | |
| Gravity | API | 1.7 |
| Sulfur | w % | 2.53 |
| CCR | w % | 31.0 |
| Asphaltenes | w % | 15.7 |
| BFD Sediment | w % | 0.26 |

Comparison of this Control Example VII* with experimental Example VI reveals that at comparable Conversion (62.4-63.2) it is possible to attain comparable product - but use of the process of this invention as in Example VI results in product containing only 0.12 w % sediment as compared to Control Example VII* which showed 0.26 w % sediment.

Although this invention has been illustrated by reference to specific embodiments, it will be apparent to those skilled in the art that various charges and modifications may be made which clearly fall within the scope of the invention.

What is claimed is:

1. A process for hydrotreating a charge hydrocarbon feed containing components boiling above 1000° F., and sediment-formers, sulfur, metals asphaltenes, carbon residue, and nitrogen which comprises:

contacting said charge hydrocarbon feed with hydrogen at isothermal hydrotreating conditions in the presence of, as catalyst, a porous alumina support bearing 2.5-6 wt % of a non-noble Group VIII metal oxide, 13-24 wt % of a Group VI-B metal oxide, and 0-2 wt % of a phosphorus oxide, said catalyst having a Total Surface Area of 165-210 m$^2$/g, a Total Pore Volume of 0.75-0.95 cc/g, and a Pore Diameter Distribution whereby 5-18% of the Total Pore Volume is present as primary micropores of diameters less than about 100 Å, 34-69% of the Total Pore Volume is present as secondary micropores of diameters of about 100 Å-200 Å, about 26-35% of the Total Pore Volume is present as mesopores of diameter <200 Å, about 22-32% of the Total Pore Volume is in pores having diameters <250 Å, and macropores of diameters <1000 Å are present in an amount of about 14-22% of the total pore volume, thereby forming hydrotreated product containing decreased contents of components boiling above 1000° F., sediment, sulfur, metals, carbon residue, asphaltenes, and nitrogen; and recovering said hydrotreated product containing decreased content of components boiling above 1000° F., sediment, sulfur, metals, carbon residue, asphaltenes and nitrogen.

2. A process for hydrotreating a charge hydrocarbon feed as claimed in claim 1 wherein the catalyst further comprises silica (SiO$_2$) in an amount less than about 2.5 wt %.

3. A process for hydrotreating a charge hydrocarbon feed as claimed in claim 1 wherein the Pore Volume of pores of diameter less than about 100 Å is 0.04 cc/g to 0.15 cc/g.

4. A process for hydrotreating a charge hydrocarbon feed as claimed in claim 1 wherein secondary micropores of diameter of about 100-200 Å are present in an amount of about 50% to 69% of Total Pore Volume.

5. A process for hydrotreating a charge hydrocarbon feed as claimed in claim 1 wherein secondary micropores of diameter of about 100-200 Å are present in an amount of about 0.40 cc/g to 0.66 cc/g.

6. A process for hydrotreating a charge hydrocarbon feed as claimed in claim 1 wherein mesopores of diameter of <200 Å are present in an amount of 19.5–33.2 cc/g.

7. A process for hydrotreating a charge hydrocarbon feed as claimed in claim 1 wherein macropores of diameter ≦1000 Å are present in an amount of about 0.11–0.20 cc/g.

8. A process for hydrotreating a charge hydrocarbon feed containing components boiling above 1000° F., and sediment-formers, sulfur, metals, asphaltenes, carbon residue, and nitrogen which comprises contacting said charge hydrocarbon feed with hydrogen at isothermal hydrotreating conditions in the presence of, as catalyst, a porous alumina support bearing 2.5–6 wt % of a non-noble Group VIII metal oxide 13–24 wt % of a Group VI-B metal oxide, and less than about 0.2 wt % of a phosphorus oxide, said catalyst having a Total Surface Area of 165–210 m²/g, a Total Pore Volume of 0.75–0.95 cc/g, and a Pore Diameter Distribution whereby less than about 15% of the Total Pore Volume is present as primary micropores of diameters less than about 100 Å, at least about 50% of the Total Pore Volume is present as secondary micropores of diameters of about 100 Å–200 Å, about 26–35% of the Total Pore Volume is present as mesopores of diameters <200 Å, 22–32% of the Total Pore Volume is in pores with diameters <250 Å and about 14–22% of the Total Pore Volume is present as macropores of diameters <1000 Å, thereby forming hydrotreated product containing decreased contents of components boiling above 1000° F., sediment, sulfur, metals, carbon residue, asphaltenes, and nitrogen; and recovering said hydrotreated product containing decreased content of components boiling above 1000° F., sediment, sulfur, metals, carbon residue, asphaltenes, and nitrogen.

* * * * *

UNITED STATES PATENT AND TRADEMARK OFFICE
CERTIFICATE OF CORRECTION

PATENT NO. : 5,435,908
DATED : July 25, 1995
INVENTOR(S) : Gerald V. Nelson, et al It is certified that error appears in the above-indentified patent and that said Letters Patent is hereby corrected as shown below:

On the title page item [57],

Abstract, line 2, delete "F." and insert therefor -- F --.

Abstract, line 7, delete "$\leq$ 20%" and insert therefor -- $\leq$ 20% --.

Abstract, line 8, delete "$\leq$ 100" and insert therefor -- $\leq$ 100 --.

Abstract, line 11, delete " >200" and insert therefor -- $\geq$ 200 --.

UNITED STATES PATENT AND TRADEMARK OFFICE
CERTIFICATE OF CORRECTION

PATENT NO. : 5,435,908
DATED : July 25, 1995
INVENTOR(S) : Gerald V. Nelson, et al It is certified that error appears in the above-indentified patent and that said Letters Patent is hereby corrected as shown below:

Col. 1, line 21, delete ">250" and insert therefor -- $\geq 250$ --.

Col. 1, line 33, delete "F." and insert therefor -- F --.

Col. 5, line 21, delete "F." and insert therefor -- F --.

Col. 5, line 32, delete "F." and insert therefor -- F --.

Col. 5, line 33, delete "F." and insert therefor -- F --.

Col. 5, line 34, delete "F." and insert therefor -- F --.

Col. 5, line 49, delete "F." and insert therefor -- F --.

UNITED STATES PATENT AND TRADEMARK OFFICE
CERTIFICATE OF CORRECTION

PATENT NO. : 5,435,908
DATED : July 25, 1995
INVENTOR(S) : Gerald V. Nelson, et al It is certified that error appears in the above-indentified patent and that said Letters Patent is hereby corrected as shown below:

Col. 5, line 63, delete "F." and insert therefor
-- F --.

Col. 6, line 12, delete "< 200" and insert therefor
-- ≥ 200 --.

Col. 6, line 24, delete "F." and insert therefor
-- F --.

Col. 6, line 26, delete "F." and insert therefor
-- F --.

Col. 6, line 28, delete "F." and insert therefor
-- F --.

Col. 6, line 33, delete "F." and insert therefor
-- F --.

Col. 6, line 35, delete "F." and insert therefor
-- F --.

Col. 6, line 38, delete "n-heptaneinsolubles and insert therefor -- n-heptane-insolubles --.

UNITED STATES PATENT AND TRADEMARK OFFICE
CERTIFICATE OF CORRECTION

PATENT NO. : 5,435,908
DATED : July 25, 1995
INVENTOR(S) : Gerald V. Nelson, et al It is certified that error appears in the above-indentified patent and that said Letters Patent is hereby corrected as shown below:

Col. 6, in the TABLE at lines 52, 53, 54, 60, 61, 63, delete "F." and insert therefor -- F --.

Col. 7, line 14, delete "F. - 850°F." and insert therefor -- F - 825°F --.

Col. 7, line 15, delete "F. - 825°F." and insert therefor -- F - 825°F --.

Col. 7, line 55, delete "< 200" and insert therefor -- $\geq$ 200 --.

Col. 8, line 3, delete "< 1000" and insert therefor -- $\geq$ 1000 --.

Col. 8, line 9, delete "$\geq$ 200" and insert therefor -- $\geq$ 200 --.

Col. 9, in the TABLE, line 3, delete "$\geq$ 250 and insert therefor -- $\geq$ 250 --.

Col. 9, line 4, delete "$\geq$ 200" and insert therefor -- $\geq$ 200 --.

UNITED STATES PATENT AND TRADEMARK OFFICE
CERTIFICATE OF CORRECTION

PATENT NO. : 5,435,908
DATED : July 25, 1995
INVENTOR(S) : Gerald V. Nelson, et al It is certified that error appears in the above-indentified patent and that said Letters Patent is hereby corrected as shown below:

Col. 9, line 5, delete "$\leq 100$" and insert therefor -- $\leq 100$ --.

Col. 9, in the TABLE, line 10, after "Pore Vol." delete "40 min 53 min 57.5 59 40 min 43.6 56.5".

Col. 9, in the TABLE, line 14, after "< 250Å" insert -- 40 min 53 min 57.5 59 40 min 43.6 56.5 --.

Col. 9, in the TABLE, line 15, after "Pore Vol." delete -- 44 min 57 min 60.5 63 44 min. 48 59".

Col. 9, in the table, line 19, after "< 200Å" insert -- 44 min 57 min 60.5 63 44 min 48 59 --.

Col 9, line 67, delete "F. - 100°F." and insert therefor -- F - 100°F --.

Col. 9, line 68, delete "F. - 300°F." and insert therefor --F - 300°F --.

Col. 10, line 24, delete "F. - 1250°F., say 1150°F." and insert therefor -- F - 1250°F, say 1150°F --.

UNITED STATES PATENT AND TRADEMARK OFFICE
CERTIFICATE OF CORRECTION

PATENT NO. : 5,435,908
DATED : July 25, 1995
INVENTOR(S) : Gerald V. Nelson, et al It is certified that error appears in the above-indentified patent and that said Letters Patent is hereby corrected as shown below:

Col. 10, line 31, delete "F. - 850°F., preferably 700°F. - 825° F., say 819°F." and insert therefor -- 650°F - 850°F, preferably 700°F - 825°F, say 819°F --.

Col. 10, line 41, delete "F. - 50°F., preferably 0°F. - 30°F." and insert therefor -- F - 50°F, preferably 0°F - 30°F --.

Col. 10, line 58, delete "F." and insert therefor -- F --.

Col. 11, line 11, delete "< 1000" and insert therefor -- ≥ 1000 --.

Col. 11, line 12, delete "< 200" and insert therefor -- ≥ 200 --.

Col. 11, line 13, delete "≤ 100" and insert therefor -- ≤ 100 --.

Col. 11, line 31, delete "F. - 1000°F." and insert therefor -- F- 1000°F --.

Col. 11, line 34, delete "F." and insert therefor -- F --.

UNITED STATES PATENT AND TRADEMARK OFFICE
CERTIFICATE OF CORRECTION

PATENT NO. : 5,435,908
DATED : July 25, 1995
INVENTOR(S) : Gerald V. Nelson, et al It is certified that error appears in the above-indentified patent and that said Letters Patent is hereby corrected as shown below:

Col. 11, in the TABLE, line 61, delete "F." and insert therefor -- F --.

Col. 12, line 6, delete "F." and insert therefor -- F --.

Col. 12, in the TABLE, line 23, delete "$\geq$" and insert therefor -- $\geq$ --.

Col. 12, in the TABLE, line 24, delete $\geq$ and insert therefor -- $\geq$ --.

Col. 12, in the TABLE, line 25, delete "$\geq$" and insert therefor -- $\geq$ --.

Col. 12 in the TABLE, Line 26, delete "$\leq$" and insert therefor -- $\leq$ --.

Col. 12, in the first TABLE, line 27, delete "$\leq$" and insert therefor -- $\leq$ --.

Col. 12, in the second TABLE, line 42 delete "<0.2" and insert therefor -- $\leq$ 0.2 --.

UNITED STATES PATENT AND TRADEMARK OFFICE
CERTIFICATE OF CORRECTION

PATENT NO. : 5,435,908
DATED : July 25, 1995
INVENTOR(S) : Gerald V. Nelson, et al It is certified that error appears in the above-indentified patent and that said Letters Patent is hereby corrected as shown below:

Col. 12, third TABLE, line 54, delete "F." and "w%" and insert therefor -- F -- and -- v% -- respectively.

Col. 12, third TABLE, line 60, delete "F." and insert therefor -- F --.

Col. 12, last line, line 67, delete "F." and insert therefor -- F --.

Col. 13, line 2, delete "F." and insert therefor -- F --.

Col. 13, line 3, delete "T" and insert therefor -- % --.

Col. 13, line 7, delete "0" and insert therefor -- — -- (dash).

Col. 13, first TABLE, line 18, delete "F." and insert therefor -- F --.

Col. 13 after the first TABLE, after line 21, insert -- The following results are as follows: --.

UNITED STATES PATENT AND TRADEMARK OFFICE
CERTIFICATE OF CORRECTION

PATENT NO.   : 5,435,908
DATED        : July 25, 1995
INVENTOR(S)  : Gerald V. Nelson, et al It is certified that error appears in the above-indentified patent and that said Letters Patent is hereby corrected as shown below:

Col. 13, second TABLE, line 27, delete "F." and insert therefor -- F --.

Col. 13, second TABLE, line 32, delete "F." and insert therefor -- F --.

Col. 14, line 3, delete "$\propto$ " and insert therefor -- - -- (dash).

Col. 14, first TABLE, line 25 delete "$\leq$ " at both occurrences and insert therefor -- $\leq$ --.

Col. 14, line 58, delete "F." and insert therefor -- F --.

Col. 14, third TABLE, line 65 delete "F." and insert therefor -- F --.

Col. 15, first TABLE, line 36, delete "F." and insert therefor -- F --.

Col. 15, first TABLE, line 42, delete "F." and insert therefor -- F --.

UNITED STATES PATENT AND TRADEMARK OFFICE
CERTIFICATE OF CORRECTION

PATENT NO. : 5,435,908
DATED : July 25, 1995
INVENTOR(S) : Gerald V. Nelson, et al It is certified that error appears in the above-indentified patent and that said Letters Patent is hereby corrected as shown below:

Col. 15, line 56, delete "F." and insert therefor -- $\overline{F}$ --.

Col. 15, second TABLE, line 61, delete "F." and insert therefor -- $\overline{F}$ --.

Col. 15, second TABLE, line 67, delete "F." and insert therefor -- $\overline{F}$ --.

Col. 16, line 23, delete "F." and insert therefor -- $\overline{F}$ --.

Col. 16, line 40, delete "< 200" and insert therefor -- $\geq$ 200 --.

Col. 16, line 42, delete ">250" and insert therefor -- $\geq$ 250 --.

Col. 16, line 42, delete "< 1000" and insert therefor-- $\geq$ 1000 --.

Col. 16, line 51, delete "F." and insert therefor -- $\overline{F}$ --.

UNITED STATES PATENT AND TRADEMARK OFFICE
CERTIFICATE OF CORRECTION

PATENT NO. : 5,435,908
DATED : July 25, 1995
INVENTOR(S) : Gerald V. Nelson, et al It is certified that error appears in the above-indentified patent and that said Letters Patent is hereby corrected as shown below:

Col. 17, line 3, delete "< 200" and insert therefor -- $\geq 200$ --.

Col. 17, line 7, delete "$\leq$ 1000" and insert therefor -- $\geq 1000$ --.

Col. 17, line 10, delete "F." and insert therefor -- F --.

Col. 18, line 8, delete "< 200" and insert therefor -- $\geq 200$ --.

UNITED STATES PATENT AND TRADEMARK OFFICE
CERTIFICATE OF CORRECTION

PATENT NO. : 5,435,908
DATED : July 25, 1995
INVENTOR(S) : Gerald V. Nelson, et al It is certified that error appears in the above-indentified patent and that said Letters Patent is hereby corrected as shown below:

Col. 18, line 9, delete "< 250" and insert therefor -- $\geq$ 250 --.

Col. 18, line 11, delete "<1000" and insert therefor -- $\geq$ 1000 --.

Col. 18, line 13, delete "F." and insert therefor -- F --.

Col. 18, line 18, delete "F." and insert therefor -- F --.

Signed and Sealed this

Thirty-first Day of October 1995

Attest:

BRUCE LEHMAN

*Attesting Officer*    *Commissioner of Patents and Trademarks*